(12) United States Patent
Ravishankar et al.

(10) Patent No.: US 11,029,412 B2
(45) Date of Patent: Jun. 8, 2021

(54) SYSTEM AND METHOD FOR EFFICIENT BROADCAST OF SATELLITE CONSTELLATION EPHEMERIS INFORMATION

(71) Applicant: Hughes Network Systems, LLC, Germantown, MD (US)

(72) Inventors: Channasandra Ravishankar, Clarksburg, MD (US); John Corrigan, Chevy Chase, MD (US); Deepak Arur, McLean, VA (US); Yash Vasavada, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 401 days.

(21) Appl. No.: 15/700,098

(22) Filed: Sep. 9, 2017

(65) Prior Publication Data
US 2018/0074208 A1    Mar. 15, 2018

Related U.S. Application Data

(60) Provisional application No. 62/393,019, filed on Sep. 10, 2016.

(51) Int. Cl.
*G01S 19/05* (2010.01)
*G01S 19/25* (2010.01)
(Continued)

(52) U.S. Cl.
CPC .......... *G01S 19/258* (2013.01); *G01S 19/05* (2013.01); *G01S 19/00* (2013.01); *G01S 19/02* (2013.01);
(Continued)

(58) Field of Classification Search
CPC ......... G01S 19/258; G01S 19/05; G01S 19/08
(Continued)

(56) References Cited

U.S. PATENT DOCUMENTS

6,016,117 A * 1/2000 Nelson, Jr. .............. G01S 19/27
342/352
6,323,803 B1 * 11/2001 Jolley ..................... G01S 5/009
342/357.42
(Continued)

*Primary Examiner* — Chuong P Nguyen
(74) *Attorney, Agent, or Firm* — Potomac Technology Law, LLC (57) ABSTRACT

Approaches for efficient broadcast of satellite ephemeris information or data in NGSO satellite systems, based on Keplerian parametric models of the satellite orbits, are provided. Keplerian orbit parameters are utilized (e.g., parametric orbit models) for improved efficiency in broadcast of ephemeris data over use of point-wise vectors. The linear change and harmonic variations in Keplerian orbit parameters are accounted for, for example, based on the specification of the linear and harmonic terms, increasing accuracy and extending duration of validity of the orbit parameters. Data compression is employed by (i) differential encoding of orbital parameters, and (ii) exploiting the correlation between the harmonic (Fourier) coefficients model of the orbit parameters. An efficient transport mechanism entails classification of information in Classes with different repetition/update rates based on information types, significantly reducing required broadcast/update data rates while allowing for a wide variation in the orbit orientation.

12 Claims, 5 Drawing Sheets

(51) Int. Cl.
*G01S 19/06* (2010.01)
*H04B 7/185* (2006.01)
*G01S 19/00* (2010.01)
*G01S 19/02* (2010.01)

(52) U.S. Cl.
CPC .......... *G01S 19/06* (2013.01); *H04B 7/18519* (2013.01); *H04B 7/18591* (2013.01)

(58) Field of Classification Search
USPC ...................................... 342/357.42, 357.45
See application file for complete search history.

(56) References Cited

U.S. PATENT DOCUMENTS

| | | | | |
|---|---|---|---|---|
| 6,560,534 B2 * | 5/2003 | Abraham | ................ | G01S 19/05 342/357.43 |
| 6,651,000 B2 * | 11/2003 | van Diggelen | ......... | G01S 19/05 701/484 |
| 7,548,200 B2 * | 6/2009 | Garin | ................... | G01S 19/258 342/357.64 |
| 7,679,550 B2 * | 3/2010 | Garrison | ................ | G01S 19/05 342/357.29 |
| 7,839,331 B2 * | 11/2010 | Zhang | .................. | G01S 19/258 342/357.66 |
| 8,207,890 B2 * | 6/2012 | Venkatraman | ........ | G01S 19/258 342/357.64 |
| 8,274,430 B2 * | 9/2012 | Garin | ................... | G01S 19/258 342/357.66 |
| 8,514,128 B2 * | 8/2013 | McBurney | .............. | G01S 19/27 342/357.66 |
| 8,538,682 B1 * | 9/2013 | Vankatraman | ......... | G01S 19/27 701/408 |
| 8,676,501 B2 * | 3/2014 | Tekawy | .................. | G01S 19/05 701/469 |
| 8,963,772 B2 * | 2/2015 | Xu | ........................ | G01S 19/258 342/357.66 |
| 9,000,979 B2 * | 4/2015 | Garin | ................... | G01S 19/258 342/357.64 |
| 9,075,140 B2 * | 7/2015 | Garrison | ................. | G01S 19/27 |
| 9,366,763 B2 * | 6/2016 | Biacs | ..................... | G01S 19/23 |
| 2007/0299609 A1 * | 12/2007 | Garin | ..................... | G01S 19/05 701/530 |
| 2011/0032147 A1 * | 2/2011 | Venkatraman | ......... | G01S 19/05 342/357.66 |
| 2012/0235861 A1 * | 9/2012 | Venkatraman | ......... | G01S 19/05 342/357.66 |
| 2013/0002484 A1 * | 1/2013 | Katz | ....................... | G01S 19/11 342/357.48 |

\* cited by examiner

SYSTEM AND METHOD FOR EFFICIENT BROADCAST OF SATELLITE CONSTELLATION EPHEMERIS INFORMATION

RELATED APPLICATIONS

This application claims the benefit of the earlier filing date under 35 U.S.C. § 119(e) from U.S. Provisional Application Ser. No. 62/393,019 (filed 2016 Sep. 10), the entirety of which is incorporated by reference herein.

BACKGROUND

In past satellite communication systems, satellites did not broadcast their ephemeris information. Ephemeris information provides real-time location information, such as position and velocity information, of the respective satellite. In such systems, without the use of satellite ephemeris information, the user terminals (UT's) would blindly transmit transmission signals, and based on such transmissions, the respective gateway would determine the UT position and instruct the UT regarding synchronization and timing for the current satellite whose beam the UT is currently within.

In subsequent systems, UT's started to include GPS positioning technology, and thus a UT could determine its own position at any given time. In such systems, it became beneficial for the UT to know the satellite locations such that the UT could then determine the necessary timing and synchronization on its own. Further, with knowledge of the satellite ephemeris information, a UT could synchronize at a given point in time with the respective satellite at a very narrow aperture of uncertainty—the UT is able to provide compensation for Doppler and other factors that affect the UT transmissions, and the gateway is thereby able to receive the UT's transmission at a frequency with significantly less uncertainty. Accordingly, system designers began to implement a periodic satellite ephemeris broadcast to provide the satellite location, direction and velocity information to the various UT's within the system. Such ephemeris broadcasts, however, required a respective level of transmission bandwidth, which reduced bandwidth available for user traffic. Accordingly, there is a trade-off between the efficiency and timing for UT synchronization and the use of valuable system bandwidth for administration and control aspects of the system (which reduces available bandwidth for user traffic).

What is needed, therefore, is an approach for efficient provision of satellite ephemeris data to user terminals in a satellite data communications network.

SOME EXAMPLE EMBODIMENTS

Embodiments of the present invention advantageously address the foregoing requirements and needs, as well as others, by providing an approach for efficient broadcast of satellite constellation ephemeris information in a satellite communications network, such as a network with multiple non-geosynchronous orbit (NGSO) satellites. According to example embodiments, the provided approaches are based on Keplerian parametric models of the satellite orbits.

In accordance with example embodiments, a method for broadcasting satellite ephemeris data for a constellation of a plurality of satellites is provided. A plurality of terms of a function $x(t)$ for each of a plurality of orbital parameters reflecting a position for each of the plurality of satellites as a function of time (t) is defined, wherein, for each of the plurality of satellites, the plurality of orbital parameters comprise the Radius $r(t)$ of the orbit of the respective satellite, the inclination $i(t)$ of the orbit of the respective satellite, the Argument of Latitude $L(t)$ of the respective satellite, and the Longitude of Ascending Node $\Omega(t)$ of the respective satellite, at the time (t), and wherein the function $x(t)$ for each orbital parameter is $x(t)=A_0^x+A_1^x \times t+x_{1,orbit}(t)+x_{2,orbit}(t)$, such that the plurality of terms comprise $A_0^x$ (which is an initial value at a reference epoch), $A_1^x$ (which is a rate of linear change), an amplitude $A_{1,orbit}^x$ and phase $\theta_{1,orbit}^x$ for a first harmonic of the orbit of the one satellite (where $x_{1,orbit}(t)$ is a complex function of the amplitude $A_{1,\ orbit}^x$ and phase $\theta_{1,orbit}^x$ for the first harmonic), and an amplitude $A_{2,orbit}^x$ and phase $\theta_{2,orbit}^x$ for a second harmonic of the orbit of the one satellite (where $x_{2,orbit}(t)$ is a complex function of the amplitude $A_{2,orbit}^x$ and phase $\theta_{2,orbit}^x$ for the second harmonic). The method comprises classifying each of the plurality of terms for an orbital parameter in one of a plurality of frequency classes, wherein the classification is based on correlation and predictability factors of the orbital parameters comprising (i) the orbital parameters that apply commonly for all of the plurality of satellites, (ii) the orbital parameters that are common or highly correlated for the satellites of a common plane (intra-plane satellites), (iii) the orbital parameters for which time-variation follows a predictable temporal trajectory determined by Newtonian mechanics, and (iv) the orbital parameters for which Fourier coefficients of the harmonic terms exhibit a high degree of correlation, and wherein each frequency class is associated with a first frequency in time (t) for updating, and a second frequency in time (t) for broadcasting, the respective terms classified therein, and wherein the first and second frequency for each frequency class is set relative to a rate of change over time (t) of the respective terms classified therein. The method further comprises determining an updated value for each of the terms of the function $x(t)$ for each of the orbital parameters for each of the plurality of satellites at the respective first frequency in time (t). The method further comprises broadcasting a current value for each of the terms of the function $x(t)$ for each of the orbital parameters for each of the plurality of satellites at the respective second frequency in time (t).

In accordance with further example embodiments, the method comprises classifying factor values corresponding to each of the plurality of terms of the function $x(t)$ for an orbital parameter within one of a plurality of frequency classes, wherein each frequency class is associated with a first frequency in time (t) for broadcasting, and a second frequency in time (t) for updating, the factor values classified therein, and wherein the first and second frequency for each frequency class is set relative to a rate of change over time (t) of the respective terms for which corresponding factor values are classified therein, as follows: (1) Class A (for relatively fast changing per-satellite information) containing factor values reflecting delta changes in $A_0^L$, $A_0^\Omega$, $A_{1,\ orbit}^4$, $A_{2,\ orbit}^4$, $\theta_{2,\ orbit}^r$ for each orbital parameter, with a first frequency on an order of seconds and a second frequency on an order of hours to days; (2) Class B (for relatively slow changing per-satellite information) containing factor values reflecting the values (relative to base values for the orbital parameters that are common or highly correlated across the entire constellation) of the terms $A_0^r$, $A_0^i$, $A_0^L$, $A_0^\Omega$, $A_{1,\ orbit}^4$, $A_{2,\ orbit}^4$, $\theta_{2,\ orbit}^r$ for each orbital parameter, with a first frequency on an order of minutes and a second frequency on an order of weeks to months; and (3) Class C containing the base values for the orbital parameters that are common or highly correlated across the entire constellation. In accordance with such embodiments, the method further comprises determining an updated value for each of the factor values corresponding to each of the terms of the function x(t) for each of the orbital parameters for each of the plurality of satellites at the respective first frequency in time (t), and broadcasting a current value for each of the factor values corresponding to each of the terms of the function x(t) for each of the orbital parameters for each of the plurality of satellites at the respective second frequency in time (t).

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

An approach for efficient broadcast of satellite constellation ephemeris information in a satellite communications network, such as a network with multiple non-geosynchronous orbit (NGSO) satellites, is described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

As will be appreciated, a processor, module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Approaches for efficient broadcast of satellite ephemeris information or data in low Earth orbit (LEO) and medium Earth orbit satellite systems, for example, based on Keplerian parametric models of the satellite orbits, are provided.

In accordance with example embodiments, Keplerian orbit parameters are utilized, such as use of parametric orbit models, to achieve improved efficiency for broadcast of ephemeris data over use of point-wise [x, y, z] vectors.

According to further embodiments, the provided approaches account for the linear change and harmonic variations in Keplerian orbit parameters, for example, based on the specification of the linear and harmonic terms, which increases the accuracy and extends the duration of validity of the orbit parameters.

According to further embodiments, the provided approaches employ data compression by (i) differential encoding of orbital parameters, and (ii) exploiting the correlation between the harmonic (Fourier) coefficients model of the orbit parameters—Significant correlation may exist between parameters specifying multiple orbits of a given satellite and parameters across neighboring satellites.

According to further embodiments, the provided approaches facilitate an efficient transport mechanism by creating two or more System Information Classes (or logical channels) with different repetition rates—for example, fast changing parameters are conveyed on a logical channel with a high periodicity, while slow changing parameters and near-constant terms are conveyed on a transport channel with a longer duration. In this context, while the terminal (UT) typically needs to read the longer-duration channel infrequency (e.g., once per week), in most cases of operation, the UT efficiently updates its downloaded model by a quick read of the high periodicity broadcast channel. Further, by placing the near-constant terms in a low-periodicity channel(s), the provided approaches significantly reduce the required data rate for the broadcast, while allowing for a wide variation in the orbit orientation.

Figure 1:
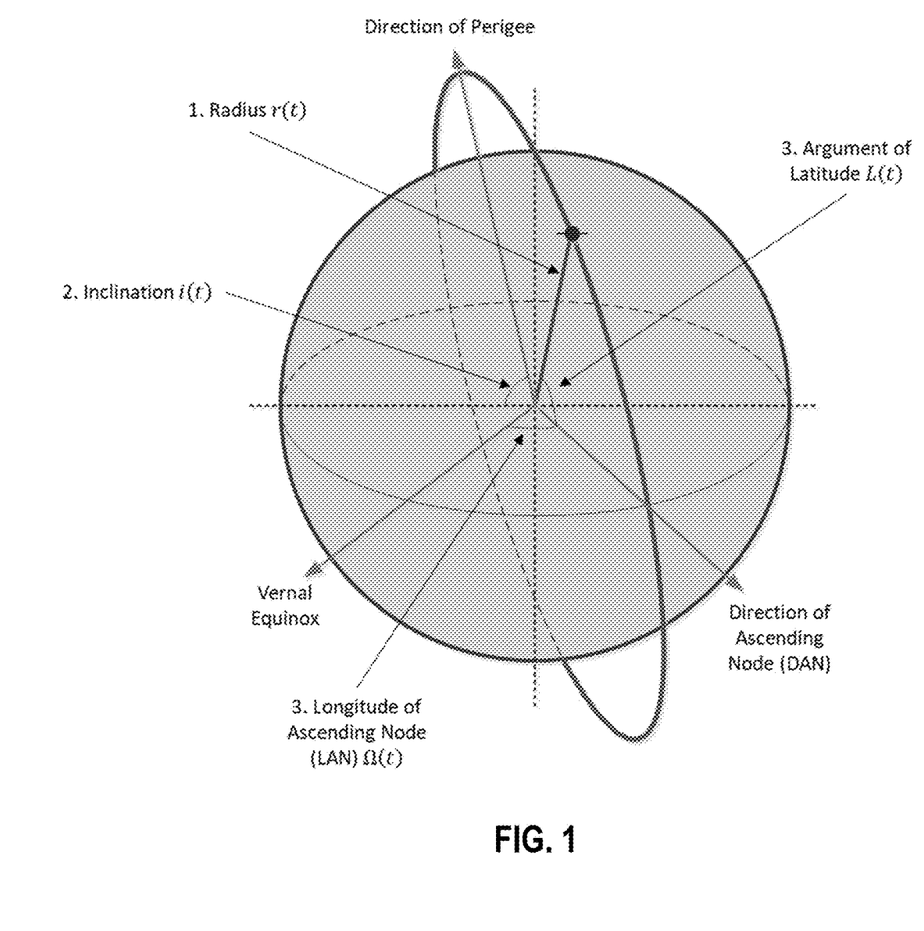
FIG. 1 illustrates a diagram of Keplerian orbit parameters utilized in accordance with example embodiments of the present invention.

By way of example, the provided approaches require the transport of four orbit parameters the position of a satellite within its orbit, as depicted in FIG. 1—the Radius r(t), the inclination i(t), the Argument of Latitude L(t), and the Longitude of Ascending Node $\Omega$(t).

By way of further example, the satellite ephemeris position vector as a function of the four orbit parameters can be expressed as follows:

$$p_s(t) = \begin{bmatrix} \cos L(t)\cos\Omega(t) - \sin L(t)\sin\Omega(t)\cos i(t) \\ \cos L(t)\sin\Omega(t) + \sin L(t)\cos\Omega(t)\cos i(t) \\ \sin L(t)\sin i(t) \end{bmatrix} \times r(t)$$
$$= u(t) \times r(t)$$

By way of further example, the satellite velocity vector can be calculated at the UT by taking time derivative of the above equation for $p_s(t)$, as follows:

$$p_v(t) = \frac{dp_s(t)}{dt} = u(t) \times \dot{r}(t) + \dot{u}(t) \times r(t)$$

Figure 2:
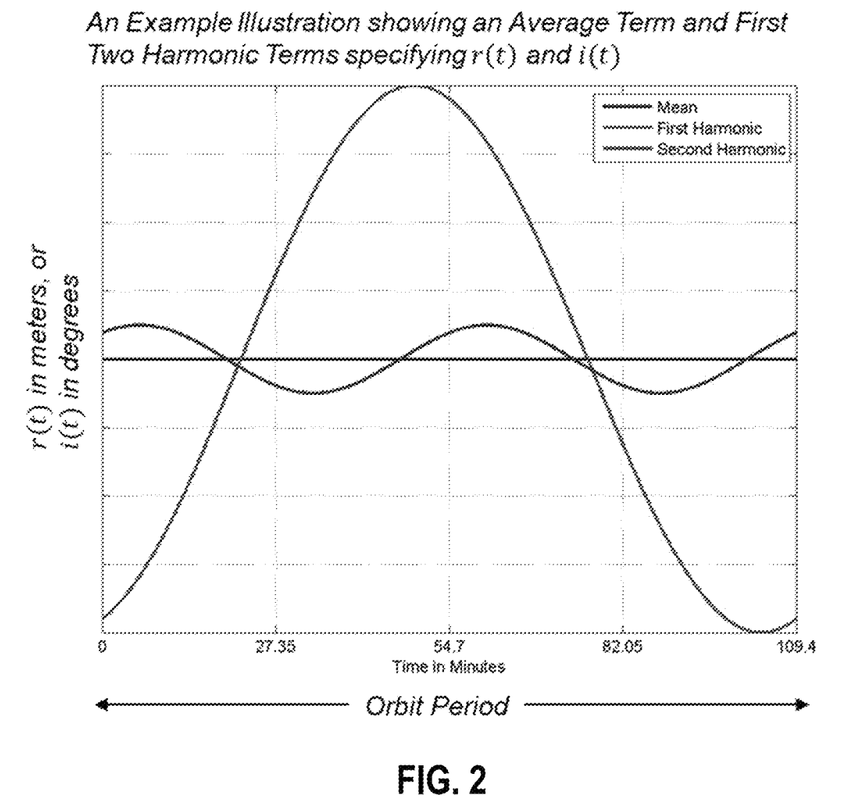
FIG. 2 shows a graph illustrating the an example of the average term and first two harmonic terms specifying r(t) and i(t)

Both the orbit radius and the inclination can be specified to a high accuracy using (i) a constant term, and (ii) the first two harmonics at the orbit period, where residual error (e.g., due to third and higher harmonic terms) is likely to remain on an order of meters (e.g., several tens of meters), as shown in FIG. 2.

Further, L(t) is the phase of the satellite within the orbit, which generally varies over 0 to $2\pi$ in one orbit period, and $\Omega$(t) is similar, except that it varies over 0 to $2\pi$ in one (sidereal) day. Atop a linear term, the time-derivatives of both L(t) and $\Omega$(t) exhibit first and second harmonic terms at the orbit period, where higher order harmonic terms are not significant. Both of these phase angles are specified to a high accuracy by (i) the phase value at reference epoch, (ii) the average rate of change, and (iii) the amplitude and phase or the first and the second harmonic terms, where residual error due to omission of higher order harmonic terms remains on an order of meters (e.g., tens of meters). For example, FIGS. 3A and 3B illustrate linear variation of the phase angles L(t) and $\Omega$(t), and the dominant terms in the derivatives of L(t) and $\Omega$(t), respectively.

Figure 3:
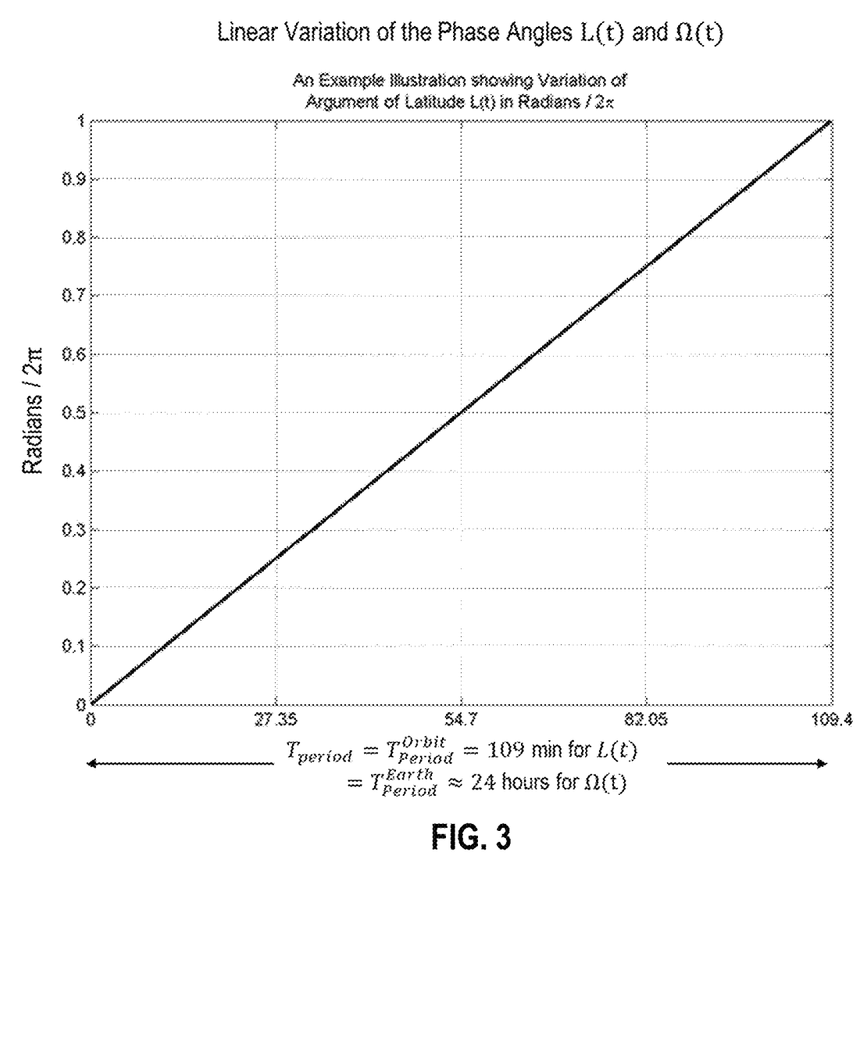
FIG. 3 shows a graph illustrating the linear variation of the phase angles L(t) and Ω(t), in accordance with example embodiments of the present invention.
Figure 4:
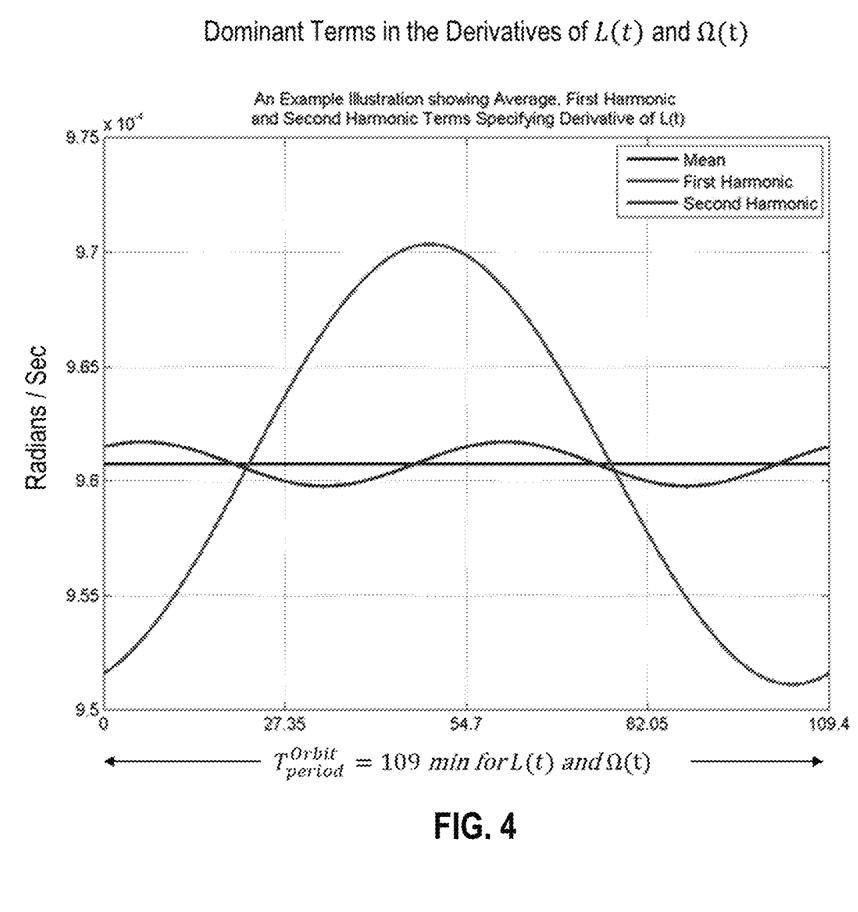
FIG. 4 shows a graph illustrating Dominant Terms in the Derivatives of L(t) and Ω(t), in accordance with example embodiments of the present invention.

Accordingly, by way of further example, as shown in the FIGS. 2-4, the following function reflects a good fit for each of the four orbit parameters for a given satellite:

$$x(t) = A_0^x + A_1^x \times t + x_{1,orbit}(t) + x_{2,orbit}(t)$$

The following six parameters are thus needed for specification of each x(t):

Initial value at the reference epoch: $A_0^x$
Rate of linear change: $A_1^x$
Amplitude of the two harmonic terms: $A_{i,\,orbit}^x$, (i=1, 2)
Phase of the two harmonic terms: $\theta_{i,\,orbit}^x$, (i=1, 2)
Where it follows that A total of 24 terms need to be specified (six coefficients for each of four orbit parameters).

Further, although transport of 24 parameters for each satellite can lead to a large broadcast data size, the actual overhead for the broadcast of the entire constellation can be made significantly smaller due to a high correlation among, and predictability of, these orbital parameters. For example, (i) some parameters consist of the constellation constants, which apply commonly for the entire constellation (and thus need not be specified on a per-satellite basis), (ii) some parameters are common or highly correlated for all the intra-plane satellites, (iii) time-variation of several of these parameters follow a predictable temporal trajectory determined by Newtonian mechanics, and (iv) Fourier coefficients of the harmonic terms exhibit a high degree of correlation.

According to an example embodiment, the data rates indicated below reflect an initial approximation for transporting the ephemeris information for the entire constellation:

SI Class A: ~2.5 kbps logical channel.
    Potentially fast changing per-satellite information (e.g., Delta changes in $A_0^L$ and $A_0^\Omega$, $A_{i,\,orbit}^r$ and $\theta_{i,\,orbit}^r$).
    Repeated once every predetermined period of time (e.g., 10 seconds), with refresh rate on the order of larger periods (e.g., hours or days).
    Terminals switched off for less than a few days typically need to wait for ~10 seconds to obtain the accurate ephemeris for the entire constellation.

SI Class B: ~0.5 kbps logical channel.
    Relatively slow changing per-satellite information.
    Values of $A_0^x$ for all four x parameters and for $A_{i,\,orbit}^r$ and $\theta_{i,\,orbit}^r$. Relative to constants advertised in Class C.
    Repeated every predetermined period of time (e.g., 60 seconds), refresh rate on the order of larger periods (e.g., after several weeks).
    Only those terminals that are switched off for weeks experience a period of wait time (e.g., 60 seconds), whereas other (active/idle) terminals can remain up to date without a wait.

SI Class C: ~0.1 kbps logical channel
    System constants base values of orbital parameters that are common or highly correlated across the entire constellation.
    For example, these parameter values may be factory installed at the UT, and they may also be provided on slow-rate broadcast logical channels to cover a wide range of design changes in the constellation.

Figure 5:
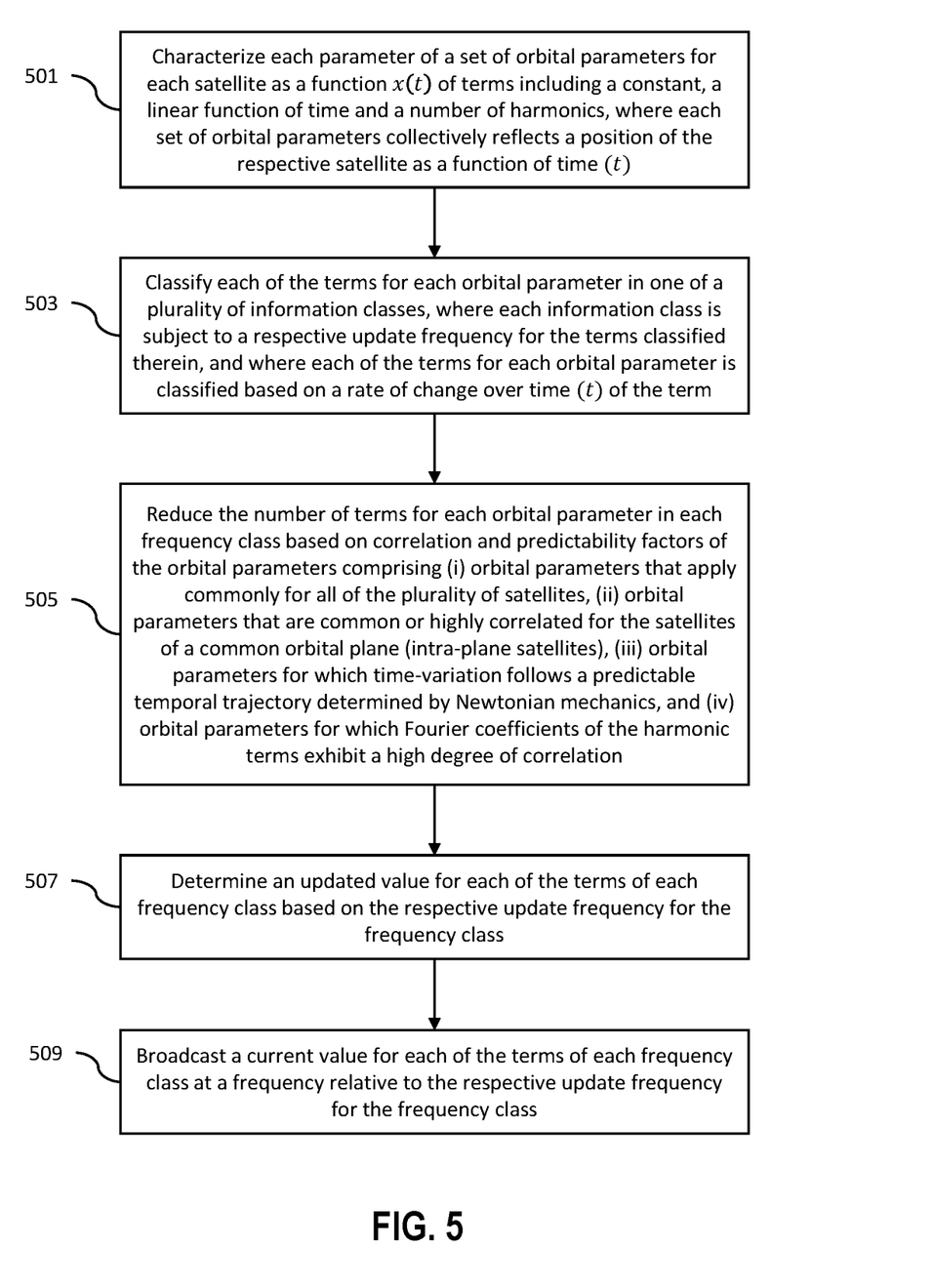
FIG. 5 shows a flow chart for a method for broadcasting satellite ephemeris data for a constellation of satellites, in accordance with example embodiments of the present invention.

FIG. 5 shows a flow chart for a method for broadcasting satellite ephemeris data for a constellation of satellites, in accordance with example embodiments of the present invention. At Step 501, each parameter of a set of orbital parameters for each satellite is characterized as a function x(t) of terms including a constant, a linear function of time and a number of harmonics, where each set of orbital parameters collectively reflects a position of the respective satellite as a function of time (t). At Step 503, each of the terms for each orbital parameter is classified in one of a plurality of information classes, where each information class is subject to a respective update frequency for the terms classified therein, and where each of the terms for each orbital parameter is classified based on a rate of change over time (t) of the term. At Step 505, the number of terms for each orbital parameter in each frequency class is reduced based on correlation and predictability factors of the orbital parameters comprising (i) orbital parameters that apply commonly for all of the plurality of satellites, (ii) orbital parameters that are common or highly correlated for the satellites of a common orbital plane (intra-plane satellites), (iii) orbital parameters for which time-variation follows a predictable temporal trajectory determined by Newtonian mechanics, and (iv) orbital parameters for which Fourier coefficients of the harmonic terms exhibit a high degree of correlation. At Step 507, an updated value for each of the terms of each frequency class is determined based on the respective update frequency for the frequency class. At Step 509, a current value for each of the terms of each frequency class is broadcast at a frequency relative to the respective update frequency for the frequency class.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for broadcasting satellite ephemeris data for a constellation of a plurality of satellites comprising:

characterizing each of a set of orbital parameters for each of the plurality of satellites as a function x(t) of a plurality of terms including a constant, a linear function of time and a number of harmonics, wherein each set of orbital parameters collectively reflects a position of the respective satellite as a function of time (t), classifying each of the plurality of terms for each orbital parameter in one of a plurality of information classes, wherein each information class is subject to a respective update frequency for the respective terms classified therein, and wherein each of the plurality of terms for each orbital parameter is classified based on a rate of change over time (t) of the term;

determining an updated value for each of the terms of each frequency class based on the respective update frequency for the frequency class; and broadcasting, by each of the plurality of satellites of the constellation, a current value for each of the terms of each frequency class at a frequency relative to the respective update frequency for the frequency class in order for a user terminal to determine a position of the respective satellite at a time (t).

2. The method according to claim 1, wherein, for each of the plurality of satellites, the plurality of orbital parameters comprise the Radius r(t) of the orbit of the respective satellite, the inclination i(t) of the orbit of the respective satellite, the Argument of Latitude L(t) of the respective satellite, and the Longitude of Ascending Node $\Omega(t)$ of the respective satellite.

3. The method according to claim 2, wherein the function x(t) for each orbital parameter is $$x(t)=A_0^x+A_1^x \times t+x_{1,orbit}(t)+x_{2,orbit}(t),$$

wherein $A_0^x$ is the constant which is an initial value at a reference time, $A_1^x \times t$ is the linear function of time which reflects a rate of linear change, $x_{1,orbit}(t)$ is a first harmonic which comprises an amplitude $A_{1,orbit}^x$ and a phase $\theta_{1,orbit}^x$ for the first harmonic for the orbit of the respective satellite, where $x_{1,orbit}(t)$ is a complex function of the amplitude $A_{1,orbit}^x$ and phase $\theta_{1,orbit}^x$ for the first harmonic, and $x_{2,orbit}(t)$ is a second harmonic which comprises an amplitude $A_{2,orbit}^x$ and a phase $\theta_{2,orbit}^x$ for the second harmonic for the orbit of the respective satellite, where $x_{2,orbit}(t)$ is a complex function of the amplitude $A_{2,orbit}^x$ and phase $\theta_{2,orbit}^x$ for the second harmonic.

4. The method according to claim 3, further comprising: reducing the number of terms for each orbital parameter in each frequency class based on correlation and predictability factors of the orbital parameters comprising (i) orbital parameters that apply commonly for all of the plurality of satellites, (ii) orbital parameters that are common or highly correlated for the satellites of a common orbital plane (intra-plane satellites), (iii) orbital parameters for which time-variation follows a predictable temporal trajectory determined by Newtonian mechanics, and (iv) orbital parameters for which Fourier coefficients of the harmonic terms exhibit a high degree of correlation.

5. The method according to claim 4, wherein the terms are classified based on their respective rates of change relative to the other terms.

6. The method according to claim 4, wherein terms that exhibit higher rates of change relative to other terms are classified in an information class broadcast on a logical channel with a high periodicity, and terms that exhibit lower rates of change relative to other terms and near-constant terms are conveyed on transport channels of respective lower periodicities.

7. The method according to claim 4, wherein there are three frequency classes Class A, Class B and Class C, wherein:

Class A is for terms reflecting relatively fast changing per-satellite information, which includes factor values reflecting delta changes in $A_0^L$, $A_0^\Omega$, $A_1^r$, orbit, $\theta_{1,orbit}^r$, $A_{2,orbit}^r$, $\theta_{2,orbit}^r$, for each orbital parameter, with a faster update frequency relative to Class B;

Class B is for relatively slow changing per-satellite information, which includes factor values reflecting values, relative to base values for terms that are common or highly correlated across the entire constellation, for the terms $A_0^r$, $A_{0hu\ i}$, $A_0^L$, $A_0^\Omega$, $A_{1,orbit}^r$, $\theta_{1,orbit}^r$ $A_{2,orbit}^r$, $\theta_{2,orbit}^r$ for each orbital parameter; and Class C is for the base values for the terms that are common or highly correlated across the entire constellation.

8. The method according to claim 1, wherein the function x(t) for each orbital parameter is $$x(t) = A_0^x + A_1^x \times t + x_{1,orbit}(t) + x_{2,orbit}(t),$$

wherein $A_0^x$ is the constant which is an initial value at a reference time, $A_1^x \times t$ is the linear function of time which reflects a rate of linear change, $x_{1,orbit}(t)$ is a first harmonic which comprises an amplitude $A_{1,orbit}^x$ and a phase $\theta_{1,orbit}^x$ for the first harmonic for the orbit of the respective satellite, where $x_{1,orbit}(t)$ is a complex function of the amplitude $A_{1,orbit}^x$ and phase $\theta_{1,orbit}^x$ for the first harmonic, and $x_{2,orbit}(t)$ is a second harmonic which comprises an amplitude $A_{2,orbit}^x$ and a phase $\theta_{2,orbit}^x$ for the second harmonic for the orbit of the respective satellite, where $x_{2,orbit}(t)$ is a complex function of the amplitude $A_{2,orbit}^x$ and phase $\theta_{2,orbit}^x$ for the second harmonic.

9. The method according to claim 8, further comprising: reducing the number of terms for each orbital parameter in each frequency class based on correlation and predictability factors of the orbital parameters comprising (i) orbital parameters that apply commonly for all of the plurality of satellites, (ii) orbital parameters that are common or highly correlated for the satellites of a common orbital plane (intra-plane satellites), (iii) orbital parameters for which time-variation follows a predictable temporal trajectory determined by Newtonian mechanics, and (iv) orbital parameters for which Fourier coefficients of the harmonic terms exhibit a high degree of correlation.

10. The method according to claim 9, wherein the terms are classified based on their respective rates of change relative to the other terms.

11. The method according to claim 9, wherein terms that exhibit higher rates of change relative to other terms are classified in an information class broadcast on a logical channel with a high periodicity, and terms that exhibit lower rates of change relative to other terms and near-constant terms are conveyed on transport channels of respective lower periodicities.

12. The method according to claim 9, wherein there are three frequency classes Class A, Class B and Class C, wherein:

Class A is for terms reflecting relatively fast changing per-satellite information, which includes factor values reflecting delta changes in $A_L^0$, $A_0^\Omega$, $A_{1,orbit}^r$, $A_{2,orbit}^r$, $\theta_{2,orbit}^r$ for each orbital parameter, with a faster update frequency relative to Class B;

Class B is for relatively slow changing per-satellite information, which includes factor values reflecting values, relative to base values for terms that are common or highly correlated across the entire constellation, for the terms $A_0^r$, $A_0^i$, $A_0^L$, $A_0^\Omega$, $A_{1,orbit}^r$, $\theta_{1,orbit}^r$, $A_{2,orbit}^r$, $\theta_{2,orbit}^r$ for each orbital parameter; and Class C is for the base values for the terms that are common or highly correlated across the entire constellation.

* * * * *

UNITED STATES PATENT AND TRADEMARK OFFICE
CERTIFICATE OF CORRECTION

PATENT NO. : 11,029,412 B2  
APPLICATION NO. : 15/700098  
DATED : June 8, 2021  
INVENTOR(S) : Channasandra Ravishankar et al.

Page 1 of 2

It is certified that error appears in the above-identified patent and that said Letters Patent is hereby corrected as shown below:

At Claim 3, Line 3 (Column 8, Line 22), the formula for *x(t)* should read as:
$$x(t) = A_0^x + A_1^x \times t + x_{1,orbit}(t) + x_{2,orbit}(t)$$

At Claim 3, Lines 5-21 (Column 8, Lines 25-41), the text should read as:
$A_0^x$ is the constant which is an initial value at a reference time,
$A_1^x \times t$ the linear function of time which reflects a rate of linear change,
$x_{1,orbit}(t)$ is a first harmonic which comprises an amplitude $A_{1,orbit}^x$ and a phase $\theta_{1,orbit}^x$ for the first harmonic for the orbit of the respective satellite, where $x_{1,orbit}(t)$ is a complex function of the amplitude $A_{1,orbit}^x$ and phase $\theta_{1,orbit}^x$ for the first harmonic, and $x_{2,orbit}(t)$ is a second harmonic which comprises an amplitude $A_{2,orbit}^x$ and a phase $\theta_{2,orbit}^x$ for the second harmonic for the orbit of the respective satellite, where $x_{2,orbit}(t)$ is a complex function of the amplitude $A_{2,orbit}^x$ and phase $\theta_{2,orbit}^x$ for the second harmonic.

At Claim 7, Lines 4-14 (Column 9, Lines 1-11), the text should read as:
Class A is for terms reflecting relatively fast changing per-satellite information, which includes factor values reflecting delta changes in $A_0^L, A_0^\Omega, A_{1,orbit}^r, \theta_{1,orbit}^r, A_{2,orbit}^r, \theta_{2,orbit}^r$ for each orbital parameter, with a faster update frequency relative to Class B;
Class B is for relatively slow changing per-satellite information, which includes factor values reflecting values, relative to base values for terms that are common or highly correlated across the entire constellation, for the terms $A_0^r, A_0^i, A_0^L, A_0^\Omega, A_{1,orbit}^r, \theta_{1,orbit}^r, A_{2,orbit}^r, \theta_{2,orbit}^r$ for each orbital parameter; and At Claim 8, Line 3 (Column 9, Line 17), the formula for *x(t)* should read as:
$$x(t) = A_0^x + A_1^x \times t + x_{1,orbit}(t) + x_{2,orbit}(t)$$

<div style="text-align: center;">
Signed and Sealed this  
Thirteenth Day of July, 2021

Drew Hirshfeld  
*Performing the Functions and Duties of the  
Under Secretary of Commerce for Intellectual Property and  
Director of the United States Patent and Trademark Office*
</div>

CERTIFICATE OF CORRECTION (continued)

At Claim 8, Lines 5-21 (Column 9, Lines 19-35), the text should read as:
$A_0^x$ is the constant which is an initial value at a reference time,
$A_1^x \times t$ the linear function of time which reflects a rate of linear change, $x_{1,orbit}(t)$ is a first harmonic which comprises an amplitude $A_{1,orbit}^x$ and a phase $\theta_{1,orbit}^x$ for the first harmonic for the orbit of the respective satellite, where $x_{1,orbit}(t)$ is a complex function of the amplitude $A_{1,orbit}^x$ and phase $\theta_{1,orbit}^x$ for the first harmonic, and $x_{2,orbit}(t)$ is a second harmonic which comprises an amplitude $A_{2,orbit}^x$ and a phase $\theta_{2,orbit}^x$ for the second harmonic for the orbit of the respective satellite, where $x_{2,orbit}(t)$ is a complex function of the amplitude $A_{2,orbit}^x$ and phase $\theta_{2,orbit}^x$ for the second harmonic.

At Claim 12, Lines 4-14 (Column 10, Lines 24-34), the text should read as:
Class A is for terms reflecting relatively fast changing per-satellite information, which includes factor values reflecting delta changes in $A_0^L$, $A_0^\Omega$, $A_{1,orbit}^r$, $\theta_{1,orbit}^r$, $A_{2,orbit}^r$, $\theta_{2,orbit}^r$ for each orbital parameter, with a faster update frequency relative to Class B;
Class B is for relatively slow changing per-satellite information, which includes factor values reflecting values, relative to base values for terms that are common or highly correlated across the entire constellation, for the terms $A_0^r$, $A_0^i$, $A_0^L$, $A_0^\Omega$, $A_{1,orbit}^r$, $\theta_{1,orbit}^r$, $A_{2,orbit}^r$, $\theta_{2,orbit}^r$ for each orbital parameter; and